United States Patent [19]

Clark, Jr.

[11] 4,152,080
[45] May 1, 1979

[54] MOBILE PET WASTE LIQUIFIER

[76] Inventor: William Clark, Jr., 134 Vermont Ave., Fort Myers, Fla. 33905

[21] Appl. No.: 851,931

[22] Filed: Nov. 16, 1977

[51] Int. Cl.² .............................................. B01F 7/00
[52] U.S. Cl. ..................................... 366/314; 366/343
[58] Field of Search ..................... 366/314, 341–343, 366/349, 48; 119/1, 95; 47/9, 48.5; 280/47.17, 47.33, 47.29, 43.24; 242/85.1

[56] References Cited

U.S. PATENT DOCUMENTS

| | | | |
|---|---|---|---|
| 1,082,069 | 12/1913 | Clements | 242/85.1 |
| 1,456,935 | 5/1923 | Richardson | 242/85.1 |
| 2,613,952 | 10/1952 | Lannon | 280/47.33 X |
| 2,668,721 | 2/1954 | Wright | 280/42 |
| 3,550,657 | 12/1970 | Swanke | 366/314 X |

Primary Examiner—Leonard D. Christian
Attorney, Agent, or Firm—Alfred E. Wilson

[57] ABSTRACT

A mobile pet waste liquifier including a main frame provided with a handle portion, a pair of wheels, a blender motor mounted on a shelf carried by the main frame and located above the wheels, a receptacle, carrying a blender blade assembly and a top lid, mounted relative to the blender motor, and arms fixed to the main frame in combination with a flexible band to retain the receptacle and blender blade assembly in place atop the blender motor. A kick stand is pivotally carried at the bottom portion of the main frame.

5 Claims, 2 Drawing Figures

MOBILE PET WASTE LIQUIFIER

BACKGROUND OF THE PRESENT INVENTION

This invention pertains to a device for the collection and liquification of domestic pet waste and provides pet owners with a means to process and dispose of their pet's waste in a sanitary acceptable manner.

In the past, most pet feces has been left where it was deposited, creating a health hazard and inconveniencing the general public, especially in large city areas. Some pet owners collect the feces in bags or the like which has always been a very unpleasant task, especially with large domestic animals. Others bury the feces which creates the never ending task of digging holes in their yards. This method of disposal creates a tendency of owners to allow the feces to accumulate for days or weeks at a time before burial, resulting in an unpleasant odor and sometimes in bad relationships with adjacent neighbors.

The device of the present invention provides a mobile collection means which can be provided in various sizes to accomodate the involved pets for the collection of their feces. This is accomplished by, first, the introduction of an appropriate chemical and/or a deodorizing solution into a receptacle carried on a frame provided with wheels and a handle portion. This helps break the feces down and kills undesirable odors when the feces is introduced into the cannister and transported to the owners residence. A motorized blender associated with the receptacle is then plugged into an electrical outlet and energized. In a relatively short period of time, the waste feces is liquified. The receptacle with the blender blade assembly is then removed from the carriage assembly and the contents thereof is discharged into the residence sewer system such as by flushing it down the toilet.

Therefore, one of the principal objects of the present invention is to provide a mobile device provided with a receptacle for reception of an appropriate chemical solution and deodorant to act on an accumulation of pet feces when it is disposed therein, to break down the feces and to neutralize the odor.

Another principal object of the invention is to provide a blender motor, fixed to the device with the blade assembly thereof positioned in the bottom end of the receptacle to liquify the feces during a relatively short period of energization.

A further object of the instant invention is to provide a quick removal means for the receptacle, whereby it may be easily removed for disposal of its contents into a residence sewer system, cleaned and repositioned on the device.

Yet another object of the present invention is to provide a kick stand for the device which may be manipulated to adapt the device for being pushed or pulled or left in a free standing attitude.

DETAILED DESCRIPTION OF A PREFERRED EMBODIMENT

Figures 1, 2:
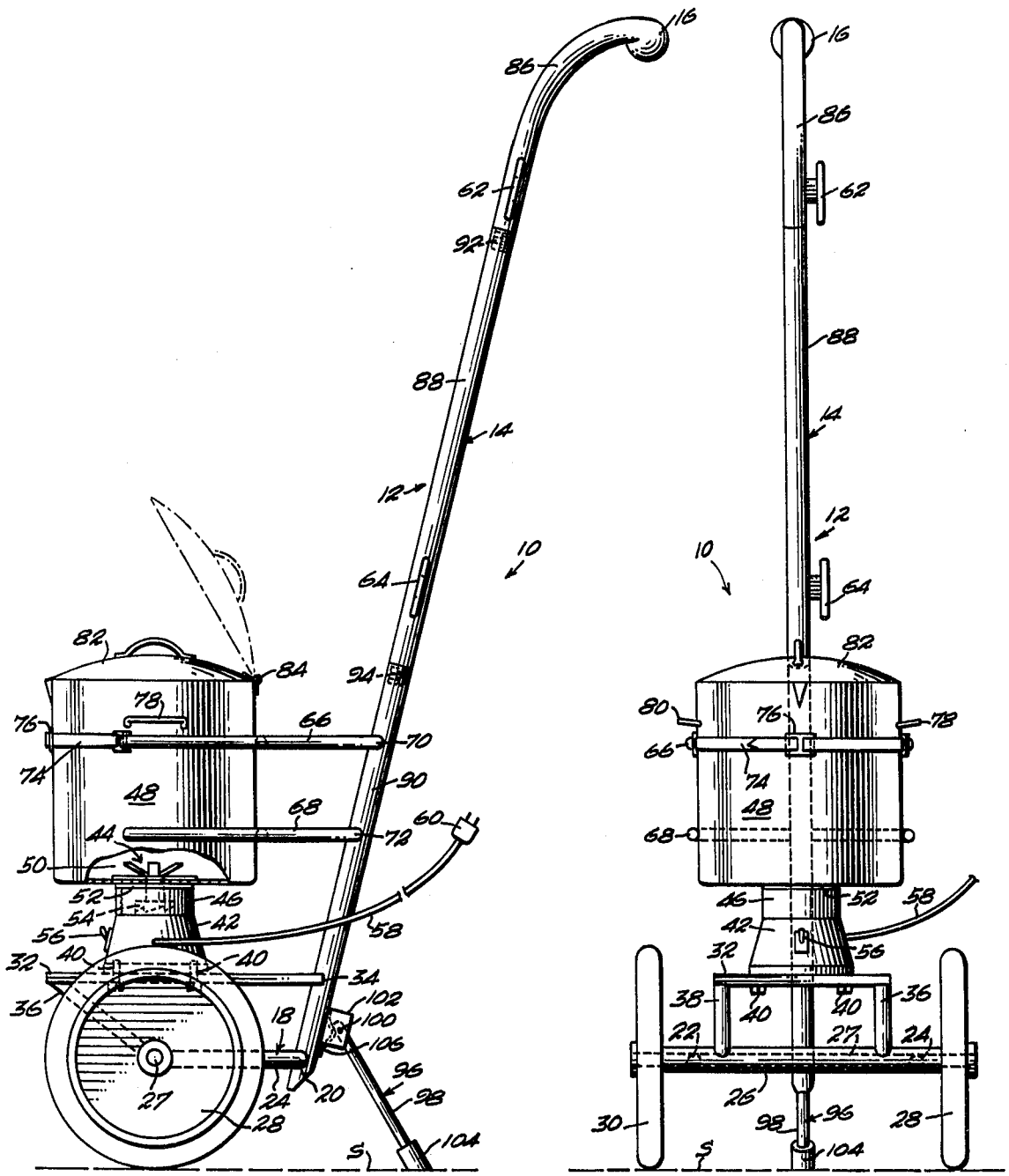
FIG. 1 is a side elevational view of the mobile pet waste liquifier of the present invention, parts being broken away to better illustrate the details thereof.
FIG. 2 is a front elevational view of the device.

With reference to the drawings in which like reference characters designate like or corresponding parts throughout the two views, the numeral 10 generally designates the mobile pet waste liquifier of the present invention. The device includes a main frame 12 comprised of a generally upstanding portion 14 terminating at its top end in a handle 16. A generally horizontally extending yoke member 18 is fixed centrally at 20 to the bottom end of frame portion 14 and at its extended ends 22, 24 to a tube 26 journalling a transverse axle 27 carrying wheels 28, 30 fixed to its respective end portions.

A shelf 32, above the axle, extends forwardly from frame portion 14 and is fixed at its rear end at 34 thereto and at its forward end the shelf 32 is fixed to the axle tube 26 by a pair of spaced apart struts 36 and 38. Fixed as by bolts 40 atop shelf 32 is a blender motor 42 for operational engagement with a blade assembly 44 fixed by a screw cap 46 to the bottom of a receptacle 48 with the blades thereof disposed within the chamber 50 of receptacle 48. A gasket 52 is disposed between the bottom of the receptacle and the screw cap 46. The blender may be of the conventional household variety with the exception that the enlarged receptacle 48 is substituted for the conventional jar receptacle, including such conventional elements as a liquid proof bearing and a separable drive cluth 54 to permit the receptacle 48 to be lifted with the blade assembly from the motor 42. Motor 42 includes an on-off switch 56. An electric conduit 58 and plug 60 from motor 42 may be wrapped around a pair of spaced apart T-shaped storage brackets 62, 64 fixed to the frame portion 14.

Upper and lower retainer yoke members 66, 68 engage partially around the receptacle 48 to position and support same on the blender motor 42, and are fixed at their extended ends at 70, 72 to frame portion 14. A retaining band 74 with buckle means 76 is carried by one yoke member such as 66 to firmly engage around and hold the receptacle 48 in yoke member 66, 68. Receptacle 48 is provided with a pair of opposed side handles 78, 80 and a lid 82 hinged thereto at 84.

As best illustrated in FIG. 1, the frame portion 14 may be sectionalized, including a top section 86, intermediate section 88 and a lower section 90, the sections being screw threaded together at 92, 94.

A kick stand 96 is provided to accomplish a free standing attitude of the device. It includes a main length 98 pivoted at 100 at a first end between a pair of ears 102, fixed to lower frame section 90, and including a capped second end 104 for engagement with a support surface S. Preferably the kick stand 96 is spring loaded as at 106 whereby it may be manipulated between the illustrated support position and an up position wherein it extends upwardly from the pivot 100 along frame section 90.

I claim:
1. A mobile pet waste liquifier comprising,
   a main frame including a generally upwardly extending handle portion, an intermediate portion and a bottom portion,
   (a) Wheel means rotatably journalled relative to said bottom portion,
   (b) a blender motor with an on-off switch mounted relative to said bottom portion and including a first clutch member drivingly connected thereto,
   (c) a receptacle removably mounted relative to said blender motor, including a blender blade assembly fixed thereto carrying a second clutch member at an outer extended end and a plurality of blender blades within an inner chamber thereof,

(d) means to position and support said receptacle relative to said blender motor to engage said first and second clutch members whereby said blender blades are actuated when said motor is energized.

2. The mobile pet waste liquifier as defined in claim 1 wherein said receptacle includes a pair of opposed side handles and a top lid hinged thereto.

3. The mobile pet waste liquifier as defined in claim 1 including a shelf fixed relative to said bottom portion and bolt attaching means securing said blender motor to the shelf.

4. The mobile pet waste liquifier as defined in claim 3 wherein said means to position and support comprises a pair of yoke members fixed to and extending forwardly from said bottom portion in embracing engagement with said receptacle, and including band means such as a belt extending in a closing relation between an open end of at least one of said yoke members.

5. The mobile pet waste liquifier as defined in claim 1 wherein said handle, intermediate and bottom portions are removably screw threaded together.

* * * * *